(12) United States Patent
Troy et al.

(10) Patent No.: US 7,885,732 B2
(45) Date of Patent: Feb. 8, 2011

(54) SYSTEMS AND METHODS FOR HAPTICS-ENABLED TELEOPERATION OF VEHICLES AND OTHER DEVICES

(75) Inventors: James J. Troy, Issaquah, WA (US); Charles A. Erignac, Seattle, WA (US); Paul Murray, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 907 days.

(21) Appl. No.: 11/764,119

(22) Filed: Jun. 15, 2007

(65) Prior Publication Data

US 2008/0103639 A1    May 1, 2008

Related U.S. Application Data

(60) Provisional application No. 60/862,952, filed on Oct. 25, 2006.

(51) Int. Cl.
G05D 1/00 (2006.01)
(52) U.S. Cl. .............................. 701/2; 701/36; 345/156
(58) Field of Classification Search ............. 701/23–28, 701/36, 2; 446/454–468; 345/156–163
See application file for complete search history.

(56) References Cited

U.S. PATENT DOCUMENTS

| | | |
|---|---|---|
| 4,654,949 A | 4/1987 | Pryor |
| 5,109,345 A | 4/1992 | Dabney et al. |
| 5,148,591 A | 9/1992 | Pryor |
| 5,281,901 A | 1/1994 | Yardley et al. |
| 5,380,978 A | 1/1995 | Pryor |
| 5,489,830 A | 2/1996 | Fernandez |
| 5,506,682 A | 4/1996 | Pryor |
| 5,637,826 A | 6/1997 | Bessacini et al. |
| 5,646,845 A | 7/1997 | Gudat et al. |

(Continued)

FOREIGN PATENT DOCUMENTS

DE    19731724    1/1999

(Continued)

OTHER PUBLICATIONS

Lam, et al., "Tele-operating a UAV using Haptics—Modeling the Neuromuscular System", Systems, Man and Cybernetics, 2005 IEEE International Conference on Waikoloa, HI, Oct. 10-12, 2005, vol. 3, pp. 2695-2700.

(Continued)

*Primary Examiner*—Richard M. Camby
(74) *Attorney, Agent, or Firm*—Lee & Hayes, PLLC

(57) ABSTRACT

Systems and methods are disclosed for haptics-enabled teleoperation of vehicles and other devices, including remotely-controlled air, water, and land-based vehicles, manufacturing robots, and other suitable teleoperable devices. In one embodiment, a system for teleoperation of a vehicle comprises a control component configured to provide position and orientation control with haptic force feedback of the vehicle based on a position measurement of the vehicle and configured to function in a closed-loop feedback manner. In a particular embodiment, the position measurement may include six degree-of-freedom position data provided by a motion capture system to the control and/or haptic I/O components of the application. The system may also use differences in position and/or velocity between the vehicle and a haptic I/O device for feedback control.

25 Claims, 5 Drawing Sheets

U.S. PATENT DOCUMENTS

| | | | |
|---|---|---|---|
| 5,721,680 | A | 2/1998 | Van Cleve et al. |
| 5,909,218 | A | 6/1999 | Naka et al. |
| 6,114,976 | A | 9/2000 | Vian |
| 6,317,658 | B1 | 11/2001 | Vian |
| 6,460,004 | B2 | 10/2002 | Greer et al. |
| 6,720,949 | B1 | 4/2004 | Pryor et al. |
| 6,896,220 | B2 | 5/2005 | McKendree et al. |
| 6,910,657 | B2 | 6/2005 | Schneider |
| 6,938,853 | B2 | 9/2005 | Pines et al. |
| 6,955,324 | B2 | 10/2005 | Tanielian |
| 7,039,367 | B1 | 5/2006 | Kucik |
| 7,054,724 | B2 | 5/2006 | Koshizen et al. |
| 7,099,747 | B2 | 8/2006 | Mikami et al. |
| 7,313,463 | B2 | 12/2007 | Herr et al. |
| 7,363,111 | B2 | 4/2008 | Vian et al. |
| 7,400,943 | B2 | 7/2008 | Vian et al. |
| 7,400,950 | B2 | 7/2008 | Reich |
| 7,445,536 | B2 | 11/2008 | Lee et al. |
| 7,731,588 | B2 * | 6/2010 | Templeman ................ 463/38 |
| 7,742,036 | B2 * | 6/2010 | Grant et al. ................. 345/156 |
| 2002/0142701 | A1 | 10/2002 | Rosenberg |
| 2003/0090682 | A1 | 5/2003 | Gooch et al. |
| 2004/0073359 | A1 | 4/2004 | Ichijo et al. |
| 2004/0221648 | A1 | 11/2004 | Wu et al. |
| 2004/0249520 | A1 | 12/2004 | Maine |
| 2005/0001091 | A1 | 1/2005 | Raney |
| 2005/0027406 | A1 | 2/2005 | Nonami et al. |
| 2005/0125099 | A1 | 6/2005 | Mikami et al. |
| 2006/0082546 | A1 | 4/2006 | Wey |
| 2006/0121818 | A1 | 6/2006 | Lee et al. |
| 2006/0238403 | A1 | 10/2006 | Golan et al. |
| 2007/0200027 | A1 | 8/2007 | Johnson |
| 2008/0033684 | A1 | 2/2008 | Vian et al. |
| 2008/0125896 | A1 | 5/2008 | Troy et al. |
| 2009/0152391 | A1 | 6/2009 | McWhirk |
| 2009/0315777 | A1 | 12/2009 | Baughman |

FOREIGN PATENT DOCUMENTS

| | | |
|---|---|---|
| GB | 2345952 | 7/2000 |
| WO | WO9918555 | 4/1999 |
| WO | WO03027599 | 4/2003 |
| WO | WO2005003676 | 1/2005 |

OTHER PUBLICATIONS

PCT Search Report for Application No. PCT/US2007/01624, mailed Jul. 16, 2008 (14 pages).

Carlson et al, "Reliability Analysis of Mobile Robots", Robotics and Automation, 2003, Proceedings ICRA 03, IEEE Intl Conf on Sep. 2003, vol. 1, 8 pages.

Castillo-Effen et al, "Modeling and Visualization of Multiple Autonomous Heterogeneous Vehicles", Systems, Man and Cybernetics, 2005 IEEE Intl Conference, Oct 2005, vol. 3, 9 pages.

Chung et al, "A Platform for Cooperative and Coordinated Control of Multiple Vehicles", In Proc. of the 3rd Conf on Cooperative Control and Optimization, Dec. 2002, Chapter 1, pp. 1-33.

Cremean et al, "The Caltech Multi-Vehicle Wireless Testbed", Decision and Control, 2002, Proceedings of the 41st IEEE Conference, Dec. 2002, vol. 1, 3 pages.

Holland et al., "Beyond Swami Intelligence: The Ultraswarm", Swarm Intelligence Symposium, 2005, SIS 2005, Proceedings 2005 IEEE, June 2005, 8 pages.

McNeely et al, "Six Degree-of-Freedom Haptic Rendering Using Voxel Sampling," Proc. ACM SIGGRAPH 99 Conf., Los Angeles, CA, Aug. 1999, pp. 401-408.

McNeely, et al, "Voxel-Based 6-DOF Haptic Rendering Improvements," Haptics-e, vol. 3, No. 7, Jan. 2006, 12 pgs.

Nardi et al, "SwarMAV: A Swarm of Miniature Aerial Vehicles", 21st Bristol Interl UAV Systems Conf, Apr. 2006, 9 pages.

Narli et al, "A Hardware-in-the-Loop Test Rig for Designing Near-Earth Aerial Robotics", Proceedings of the 2006 IEEE Internl Conference on Robotics and Automation, Orlando, Florida, May 2006, pp. 2509-2514.

Rizos, "Pseudolite Augmentation of GPS", presented at workshop on Geolocation and Navigation technology to support environmental geophysical mapping applications, organized by Strategic Environmental Research and Development Prog and Environmental Security Technology Certif Prog, May 2005, 15 pages.

Troy, et al, "Closed-Loop Motion Capture Feedback Control," (In Review), 2006, 2 pgs.

Troy, "Haptic Control of a Simplified Human Model with Multibody Dynamics," Phantom users Group Conf., Aspen, CO. Oct. 2000, pp. 43-46.

Vachtsevanos et al, "From Mission Planning to Flight Control of Unmanned Aerial Vehicles: Strategies and Implementation Tools", Annual Reviews in Control, 29 (2005), pp. 101-115.

Extended EP Search Report for Application No. 10162866.7, dated Jun. 29, 2010, 6 pgs.

* cited by examiner

SYSTEMS AND METHODS FOR HAPTICS-ENABLED TELEOPERATION OF VEHICLES AND OTHER DEVICES

CROSS REFERENCE TO RELATED APPLICATIONS

This patent application claims priority under 35 U.S.C. § 120 from U.S. Application No. 60/862,952 filed Oct. 25, 2006, which provisional incorporated herein by reference.

FIELD OF THE INVENTION

This invention relates generally to systems and methods for haptics-enabled of devices, including unmanned aerial vehicles and the like.

BACKGROUND OF THE INVENTION

A variety of different devices can be operated remotely, including remotely-controlled air, water, and land-based vehicles, manufacturing robots, and other suitable devices. In general, such teleoperable devices require a control system that enables a human operator or a machine controller to monitor movements of the vehicle and issue appropriate control signals to cause the device to move as desired. Clearly, a wide variety of controllable devices need control systems to effectuate the desired controllable movement. However, prior art teleoperation systems and methods may not provide the desired controllability of such devices. Although prior art systems and methods have achieved desirable results, there is room for improvement.

SUMMARY OF THE INVENTION

The present invention is directed to systems and methods for haptics-enabled teleoperation of devices, including remotely-controlled air, water, and land-based vehicles, manufacturing robots, and other suitable teleoperable devices. Embodiments of the invention may advantageously provide improved control of teleoperable devices in comparison with prior art systems and methods. For example, in some prior circumstances, the ability of an operator to control a teleoperable device may be diminished because the operator does not physically experience a feedback of forces and accelerations that the operator would experience if she were positioned onboard the teleoperable device. In the case of an aircraft, an experienced onboard pilot can often perform a landing without using instrumentation by relying on visual input and by feeling feedback (e.g. forces and accelerations) produced by the motions of the aircraft. Physically sensing acceleration forces may be particularly important to a helicopter pilot.

In one embodiment, a system for teleoperation of a vehicle comprises a control component configured to provide position and orientation control with haptic force feedback of the vehicle based on a position measurement of the vehicle and configured to function in a closed-loop feedback manner. In a particular embodiment, the position measurement may include six degree-of-freedom position data provided by a motion capture system to the control and/or haptic I/O components of the application. The system may also use differences in position and/or velocity between the vehicle and a haptic I/O device for feedback control.

In another embodiment, a method of operating a teleoperable device by directly controlling least one of position and orientation of the teleoperable device includes providing an input to a haptics device virtually coupled to the teleoperable device; providing at least one control signal to the teleoperable device based on the input, the at least one control signal being configured to directly control at least one of position and orientation of the teleoperable device; measuring at least one state characteristic of the teleoperable device; and providing a haptics output to an operator based on at least one of a response from the teleoperable device and the at least one state characteristic.

In a further embodiment, a system for operating a teleoperable device by controlling at least one of position and orientation of the teleoperable device includes a haptics device coupleable to the teleoperable device and configured to receive an operator input; and a sensing system operatively coupled to the haptics device and configured to measure at least one state characteristic of the teleoperable device, wherein the haptics device is further configured to provide at least one control signal to the teleoperable device, the at least one control signal being configured to directly control at least one of position and orientation of the teleoperable device based on at least one of the operator input and the at least one state characteristic.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

Embodiments of the present invention are described in detail below with reference to the following drawings.

DETAILED DESCRIPTION

The present invention relates to systems and methods for haptics-enabled teleoperation of devices, including such controllable devices as flight vehicles, water and land-based vehicles, manufacturing vehicles and systems, and any other suitable controllable device or system. Many specific details of certain embodiments of the invention are set forth in the following description and in FIGS. 1-9 to provide a thorough understanding of such embodiments. One skilled in the art, however, will understand that the present invention may have additional embodiments, or that the present invention may be practiced without several of the details described in the following description.

In general, embodiments of the present invention provide feedback of a teleoperable device's motion to an operator via a haptics-enabled feedback system. The operator receives feedback from the teleoperable device which may enable the operator to control the device (e.g. aircraft) using both visual and physical stimuli, thereby providing improved controllability in comparison with prior art systems. In the case of teleoperable aircraft, embodiments of methods and systems in accordance with the present invention may be implemented in either fly-by-wire control systems or direct control systems as desired.

The teleoperation control capabilities provided by embodiments of the invention may be further extended by adding a haptic force feedback interface and a real-time simulation environment to the application. These aspects may provide an intuitive and efficient method for precise control of remotely piloted systems. The low level feedback of the device's motions is available to the operator, which may provide an intuitive understanding or "feel" of the dynamics of the teleoperable device. A basic concept of haptics-enabled embodiments described herein involves connecting force feedback calculations to a control loop through virtual coupling and proxy objects, which may be defined in a real-time simulation environment running simultaneously with a control system. This type of force feedback enables applications that require precise motion control. The intuitive feedback provides a more natural interface that results in more efficient operation of the vehicle or device, and also gives the remote pilot or operator a faster reaction time to unexpected disturbances.

Figure 1:
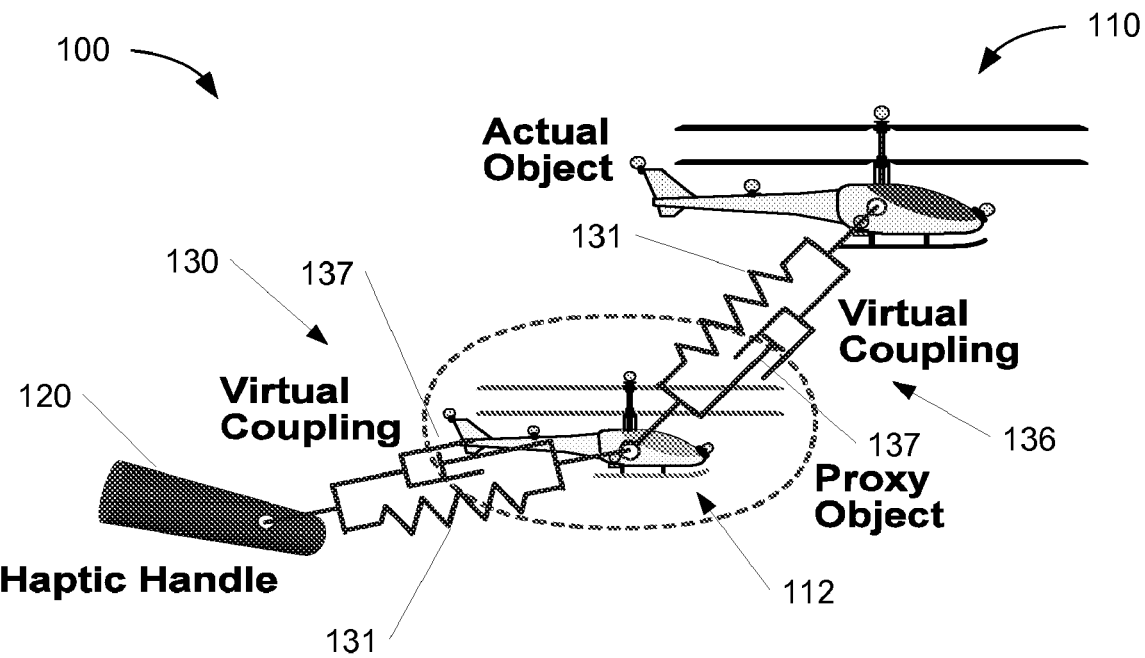
FIG. 1 is a schematic view of a teleoperated system including a teleoperable device, a haptic force feedback I/O device, and a representation of the mathematical system model in accordance with an embodiment of the invention.

FIG. 1 is a schematic view of a teleoperated system 100 having a teleoperable device 110 in accordance with an embodiment of the invention. In this embodiment, the teleoperable device 110 is a helicopter, however, in alternate embodiments, the teleoperable device 110 may be any type of vehicle, robot, machine, or other suitable device. In one particular embodiment, the teleoperable device 110 is a modified version of an E-flite Blade CX 180 RC helicopter commercially available from Horizon Hobby, Inc. of Champaign, Ill.

Control and force feedback of the teleoperable device 110 is provided by a haptics device (or handle) 120. A first virtual coupling 130 operatively couples the haptics device 120 to a proxy object 112, and a second virtual coupling 136 operatively couples the proxy object 112 to the teleoperable device 110. In this embodiment, each of the first and second virtual couplings 130, 136 includes a multi-degree-of-freedom spring element 131, 137 and a multi-degree-of-freedom damper element 133, 138.

Figure 2:
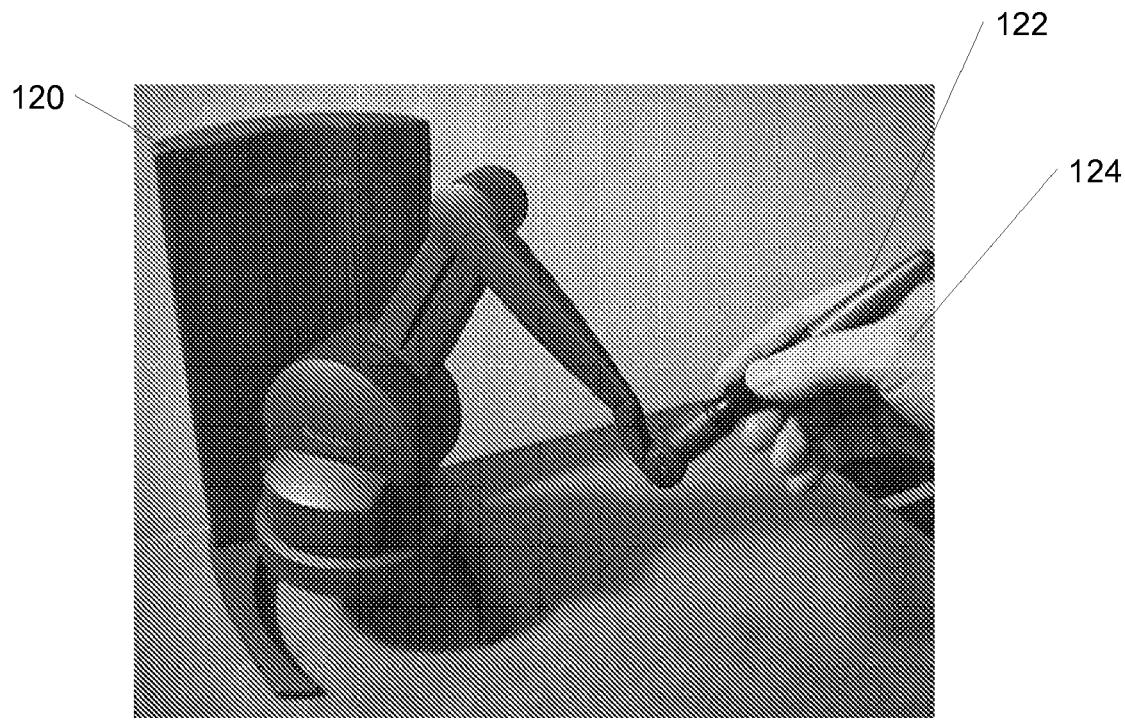
FIG. 2 is an image (perspective view) of a haptics device of the teleoperated system of FIG. 1.

FIG. 2 is a perspective view image of an embodiment of the haptics device 120 of FIG. 1. In general, haptics devices are interfaces for the sense of touch. For haptic teleoperation, this interface may be bi-directional, meaning that a user 124 provides position or force input to the system 100 and software controlling the haptics device 120 provides a position response by moving components (e.g. motors, actuators, etc.) in the haptics device 120. Resistance to this motion by the user 124 produces the force feedback. With haptic interaction, the user 124 may be afforded more than just another type of input device. Haptics devices provide a high-bandwidth channel for additional information flow to the user from the system or application. This type feedback of information is not available from input-only devices like joysticks. The interaction with the haptics device 120 is similar to what would be felt by the user if the actual vehicle was being held and manipulated by the user 124. The forces can be scaled so that larger or smaller vehicles can be controlled by the same type of haptic interface. The forces felt by the user in this type of teleoperation are computed based on a combination of the inertia forces generated by vehicle accelerations, and by constraint forces generated in the physics-based virtual environment. The advantage of this type of feedback is that it allows the user to perceive additional information about the vehicle's condition or the environment in which it is operating. Some examples of this type of feedback include:

Inertia forces provide information about magnitude and direction of acceleration Contact and near-contact forces (proximity) may be represented as a barrier Headwinds may be interpreted as a direction specific resistance to motion Turbulence may be transmitted as a vibration force Vehicle sluggishness due to low battery power may be felt as a resistance to motion Increased mass due to lifting an object may be felt as an increased vertical resistance In the particular embodiment shown in FIG. 2, the haptics device 120 is a bi-directional force feedback device in the form of an articulated robot arm, called a PHANTOM® haptics device, which is commercially-available from SensAble Technologies, Inc. of Woburn, Mass. Of course, in alternate embodiments, any other suitable embodiments of haptics devices may be used. The haptic device 120 includes a handle 122 having up to six inputs: three Cartesian translations (x, y, z) and three rotations (roll, pitch, yaw). The haptic device 120 may output forces in three Cartesian dimensions. In applications where a six degree-of-freedom output haptic device is used, additional rotation forces (torques) may also be felt through the handle 122, giving the user 124 roll, pitch, and yaw torque feedback.

In operation, motion forces applied to any component (e.g. the haptics device 120, the teleoperable device 110, and the dynamics elements of the physics-based simulation environment 416) of the system 100 will be transmitted to other components of the system 100. This two-way interaction is called bilateral force feedback for a two I/O port system. In the embodiment shown in FIGS. 1 and 2, both the haptics device 120 and the teleoperable device 110 are seen by the other as a peer with similar I/O capabilities.

In one embodiment, the user 124 operates the teleoperated system 100 by moving (i.e., translating and rotating) the handle 122 of the haptics device 120, while watching either a simulation on a screen or live motion of the teleoperable device 110. Moving the teleoperable device 110 from one place to another involves a scaled mapping of the motion of the haptics device 120 to the motion of the teleoperable device 110. In some embodiments, position control of the handle 122 of the haptics device 120 can be indexed (repositioned) by pressing a stylus button (not shown) on the handle 122. The indexing is similar in concept to picking up and repositioning a mouse to get a more useful position on a mouse pad. Indexing can also be applied to relative orientation.

Movement of the haptics device 120 produces a corresponding movement of the proxy object 112 through the first virtual coupling 130, which in turn produces a movement of the teleoperable device 110 through the second virtual coupling 136. The details of implementing the first and second virtual couplings 130, 136 are generally known, and will be described in greater detail below. In some embodiments, for example, the virtual couplings 130, 136 are implemented using one or more methods described in one or more of the following publications (incorporated herein by reference):

McNeely, W. A., Puterbaugh, K. D., and Troy, J. J., "Six Degree-of-Freedom Haptic Rendering Using Voxel Sampling." Proc. ACM SIGGRAPH 99 Conf., Los Angeles, Calif., pp 401-408, August 1999; McNeely, W. A., Puterbaugh, K. D., and Troy, J. J., "Voxel-Based 6-DOF Haptic Rendering Improvements", Haptics-e, Vol. 3, No. 7, January 2006 (hereinafter "Haptics-e publication by McNeely et al."); and Troy, J. J., "Haptic Control of a Simplified Human Model with Multibody Dynamics." Phantom Users Group Conf., Aspen, Colo., pp. 43-46, October 2000; Adams, R. J. and Hannaford, B., "A Two-Port Framework for the Design of Unconditionally Stable Haptic Interfaces", Proc. IROS, Anaheim, Calif., 1998.

For example, as disclosed in the above-referenced paper entitled "Six Degree-of-Freedom Haptic Rendering Using Voxel Sampling," in some embodiments, the virtual couplings 130, 136 may be dynamically modeled using an impedance approach, in which user motion is sensed and a force/torque pair is produced. Specifically, a virtual coupler scheme may be adopted which connects the user's haptic motions with the motions of the dynamic object through a virtual spring and damper. To solve for the motion of the dynamic object, a numerical integration of the Newton-Euler equation may be performed using a constant time step corresponding to a time between force updates (e.g. 1 msec for a 1000 Hz haptic refresh rate). In addition, a mass may be assigned to the dynamic object equal to an apparent mass of the dynamic object that a user may feel at the haptic device (in addition to the haptic device's intrinsic friction and inertia, and assuming its forces are not yet saturated).

In such a dynamic model, a net force and torque on the dynamic object may be a sum of contributions from a spring-damper system conceptually placed in a virtual scene and coupled between the haptic device and the dynamic object. The real haptic device controls the position and orientation of its virtual counterpart, and influences the spring's displacement which generates a virtual force/torque on the dynamic object and an opposite force/torque on the real haptic handle. Spring displacement may also include rotational motion. Spring force may be proportional to displacement, while spring torque may be proportional to an angle of rotation from an equivalent-angle analysis and directed along an equivalent axis of rotation.

Furthermore, a six degree-of-freedom (6-DOF) spring makes the dynamic object tend to acquire the same position and orientation of the virtual haptic device, assuming that the two objects are initially registered in some manner (e.g. with the center of the haptic device located at the dynamic object's center of mass and the device's main axis aligned with one of the dynamic object's principal axes). The virtual object is assigned mass properties, which may be reflected at the haptic interface as apparent mass that is added to the haptic device's intrinsic inertia. The force and torque equations used are as follows:

$$F_{spring} = k_T d - b_T \vec{v}$$

$$\vec{\tau}_{spring} = k_R \vec{\theta} - b_R \vec{\omega}$$

where $k_T$, $b_T$ = spring translational stiffness and viscosity $k_R$, $b_R$ = spring rotational stiffness and viscosity $\vec{\theta}$ = equivalent-axis angle (including axis direction)

$\vec{v}$, $\vec{\omega}$ = dynamic object's relative linear and angular velocity Spring stiffness may be set to a reasonably high value that is still comfortably consistent with stable numerical behavior at the known time sampling rate. Stiffness and viscosity may be straightforwardly related to obtain critically damped behavior. This model is most valid for a dynamic object having equal moments of inertia in every direction, such as a sphere of uniform mass density, which is typically an acceptable assumption if reflected moments of inertia are not desired or necessary. Assuming equal moments of inertia in every direction typically represents an implicit constraint on the virtual object's mass density distribution, but not on its geometrical shape.

Figure 3:
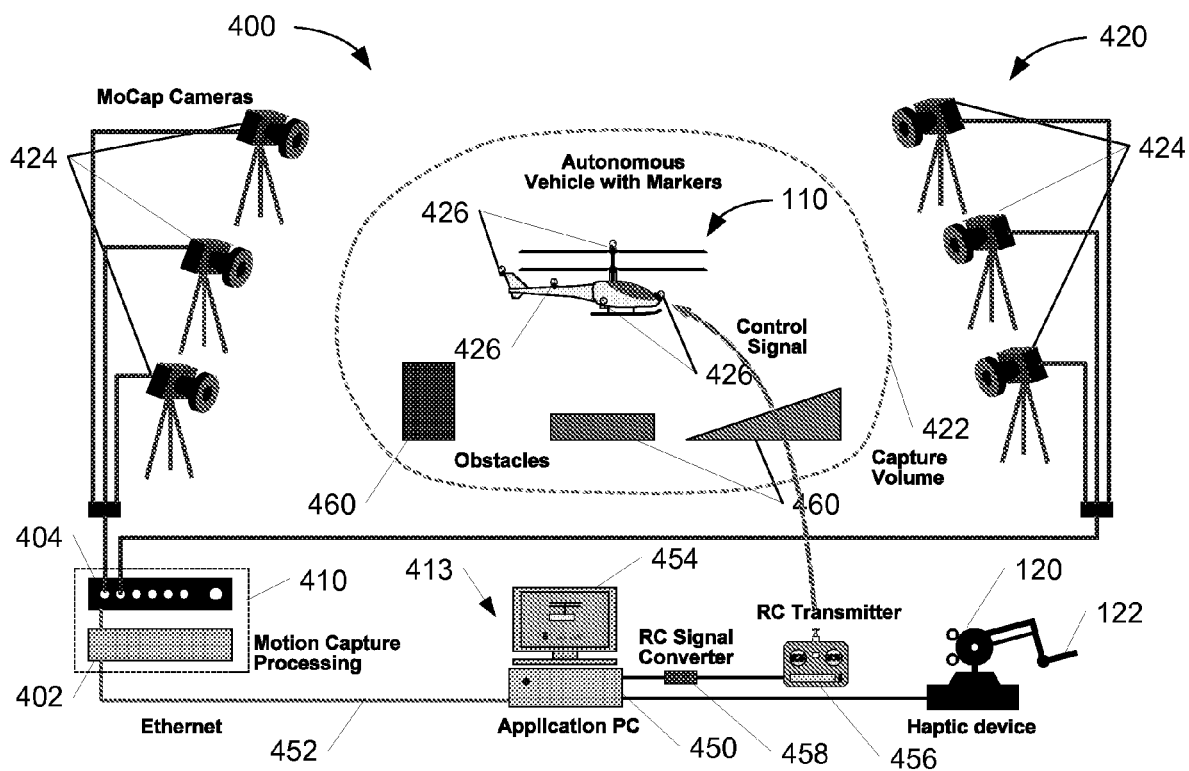
FIG. 3 is a haptics-enabled teleoperated system incorporating a motion capture tracking system in accordance with another embodiment of the invention.
Figure 4:
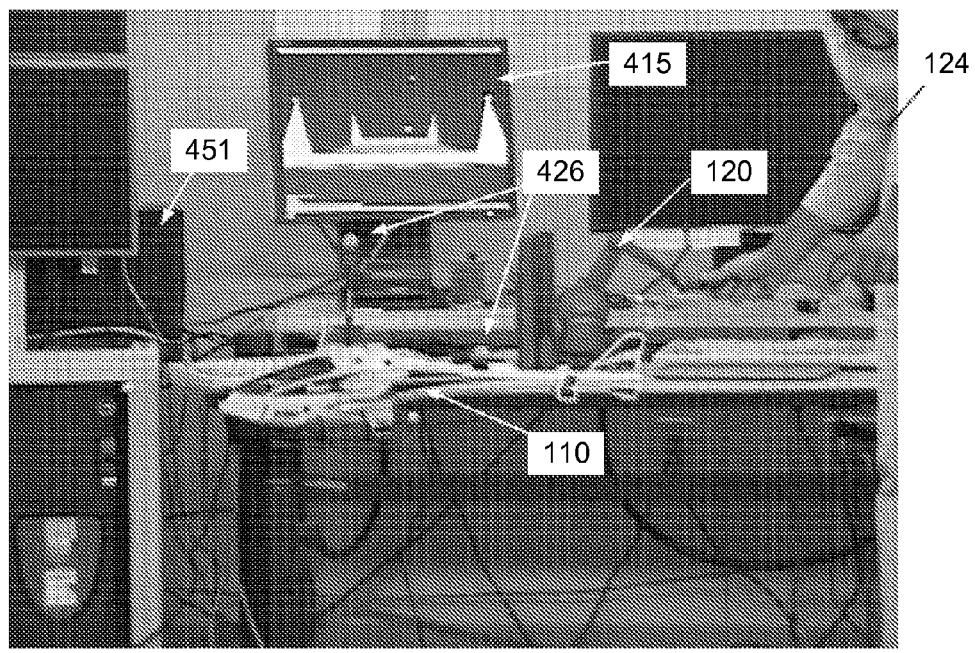
FIG. 4 is an image of a teleoperable device, and haptic device, and view of the virtual environment of FIG. 3 in operation.

FIG. 3 is a schematic view of a teleoperated system 400 in accordance with another embodiment of the invention. FIG. 4 shows the teleoperated system 400 during operation by the user 124. In this embodiment, the teleoperated system 400 includes the teleoperable device 110 and the haptics device 120 as described above with reference to FIGS. 1 and 2. The teleoperated system 400 also includes a motion capture system 420 having a processing unit 410 coupled to a plurality of cameras 424. The teleoperable device 110 is positioned within a control (or capture) volume 422 monitored by the motion capture system 420. The teleoperable device 410 may be a vehicle, such as a manned or unmanned aerial vehicle (UAV), a ground vehicle, a water-based vehicle, a manufacturing robot, or any other type of controllable device. Furthermore, the teleoperable device 110 may be powered by any suitable energy source, including battery, solar, gas, and fuel-cell powered devices.

In some embodiments, the processing unit 410 may include a motion processing PC 402, and a camera data collection unit 404. The camera data collection unit 404 may be configured to collect real-time image information from the motion capture cameras 424, process the data, and transmit the information to the motion processor 402. The processing unit 410 is coupled to an application computer (or analysis and display component) 450 via a datalink 452 (e.g. an Ethernet connection), and a display 454 is coupled to the application computer 450. Running on the application computer 450 is a control program 413 that may be configured to receive input signals from the haptics device 120 and the processing unit 410, and to output suitable control signals to the teleoperable device 110 for movement, stabilization, and recovery from external disturbances via a communications component 456.

In alternate embodiments, one or more of the processor unit 410, the motion processor 402, and the application computer 450 can be combined. The application computer 450, or another environment monitoring computer, can be used to display position, orientation, and other telemetry data of the teleoperable device 110. For example, desired trajectory as well as the actual trajectory can be plotted in near real-time. Other obstacles and constraints 460 can also be displayed, as well as derived data from the control or measurement systems.

In one embodiment, the communications component 456 is an RC transmitter, however, in alternate embodiments, the communication component 456 may communicate with the teleoperable device 110 using any suitable communication method, including, for example, the Bluetooth® short range wireless communication standard established by Bluetooth SIG, Inc. of Bellevue, Wash., the 802.11 wireless communication standard developed by the Institute of Electrical and Electronics Engineers, or any other suitable communications standards or protocols. A converter 458 (e.g. an RC signal converter) may be coupled between the application computer 450 and the communication component 456 to convert control signals from the application computer 450 to a format suitable for transmission to the teleoperable device 110 by the communication component 456.

With continued reference to FIGS. 3 and 4, the motion capture cameras 424 of the motion capture system 420 are operatively distributed about the control volume 422, and are configured to monitor the positions and movements of a plurality of retro-reflective markers 426 disposed on the teleoperable device 110. The retro-reflective markers 426, which reflect light back to the source (in this case, the motion capture cameras 424 which can carry their own light source), can be comprised of various shapes, including tape, spheres, semi or half spheres, or any other suitable shapes.

In some embodiments, the motion capture cameras 424 may operate in the visible portion of the spectrum, however, in alternate embodiments, devices that operate in other portions of the spectrum (e.g. near infrared, infrared, etc.) may be used. The motion capture cameras 424 are configured to monitor the retro-reflective markers 426 and to export the positions of the retro-reflective markers 426 to the processing unit 410 in real-time. The position and orientation of the teleoperable device 110 may then be determined by the application computer 450. Alternately, using a priori knowledge of the positions of the retro-reflective markers 426 on the teleoperable device 110, the motion capture cameras 424 (or the processing unit 410) may internally process the measured marker position data to derive position and orientation data of the teleoperable device 110, and may output the position and orientation data of the teleoperable device 110 to the application computer 450.

Embodiments of teleoperated systems and methods having a motion capture system 420 advantageously provide the ability to perform remotely piloted, closed-loop haptic feedback. In one particular embodiment, a total of six motion capture devices 424 are distributed about an approximately room-sized control volume 422 (e.g. 25'×25'×10') and are configured to provide sub-millimeter position accuracy of the positions of the retro-reflective markers 426 at refresh rates of up to 500 Hz. In another embodiment, the motion capture devices 424 include correlated motion measurement systems having sub-centimeter positional accuracies, update frequencies of at least 20 Hz, and latency periods of $\frac{1}{20}$th second or less.

The motion capture system 420 may provide six degree-of-freedom motion tracking of the teleoperable device 110 in approximately real-time to enable closed-loop feedback control of the position, movement, and stabilization characteristics of the teleoperable device 110. In alternate embodiments, any suitable number of motion capture devices 424 (e.g. two or more) may be used, and the control volume 422 may be scaled up or down to any desired size. Similarly, in alternate embodiments, the motion capture devices 424 may be configured to provide any suitable or desired resolution and operational frequency. In one particular embodiment, an update rate of 50 Hz and accuracy of 1 mm was found to provide an electrical RC helicopter system as shown in FIG. 3 with a mass of 240 g, stable control and sufficiently fast recovery from external disturbances. The same vehicle was also shown to have stable performance at 20 Hz update rates, but with slower recovery from disturbances. Suitable motion capture devices 424 that may be used in the motion capture system 420 include those devices commercially available from Vicon Limited of Oxford, UK, as well as motion capture systems commercially available from Motion Analysis Corp. of Santa Rosa, Calif. Additional details and alternate embodiments of suitable motion capture systems are described in co-pending, commonly owned U.S. patent application Ser. No. 11/459,631 filed Jul. 24, 2006 and entitled "Closed-Loop Feedback Control Using Motion Capture Systems," which patent application is incorporated herein by reference. Additional information can be found in the research paper: Troy, J. J., Erignac, C. A., Murray, P. "Closed-Loop Motion Capture Feedback Control of Small-Scale Aerial Vehicles", AIAA Infotech@Aerospace Conference, May 2007.

In some embodiments, a virtual environment may be created to simulate various aspects of the actual environment (e.g. the control volume 422) in which the teleoperable device 110 is to be operated. Such a virtual environment may be modeled on the application computer 450 and may be used by the control program 413 for various purposes, including providing haptic feedback to the user 124 via the haptics device 120.

FIG. 4 shows the display of a virtual environment 415, a haptics processing PC 451, and the haptics device 120. Software 416 running on the haptics processing PC 451 uses a physics-based simulation of the controlled vehicle and other static or moving objects in the 3D virtual environment 415. In some embodiments, the functions of the haptics PC 451 can also be handled by the main application computer 450, when enough processing power is available on the application computer 450. Position and orientation information from the vehicle tracking system in the real environment was integrated with the physics-based simulation data using the multi-agent virtual coupling technique shown in FIG. 9.

In some aspects, in order for the haptics device 120 to output the appropriate position/force feedback responses, haptics application software (e.g. that may reside in the haptics device 120 or in the application computer 450) calculates the necessary reaction control forces based on user inputs. Some embodiments of the invention use a full 3D model simulation in a physics-based environment, which may be of the type generally used for a digital pre-assembly analysis.

For example, in some embodiments, geometric constraints can be created by using three dimensional (3D) models in the virtual environment. One or more objects (or obstacles) 460 existing in the real environment may be modeled and imported into the virtual environment. Wall and ceiling constraints can be included to define the extent of motion within an indoor environment. Artificial moving geometry can also be created that doesn't have a physical counterpart, such as virtual obstacles or the area directly above and below another helicopter (e.g. to avoid disturbances due to air flow generated by the rotors). Related to this is the option to allow the geometry "seen" by one helicopter to be different than the geometry seen by another.

Figure 5:
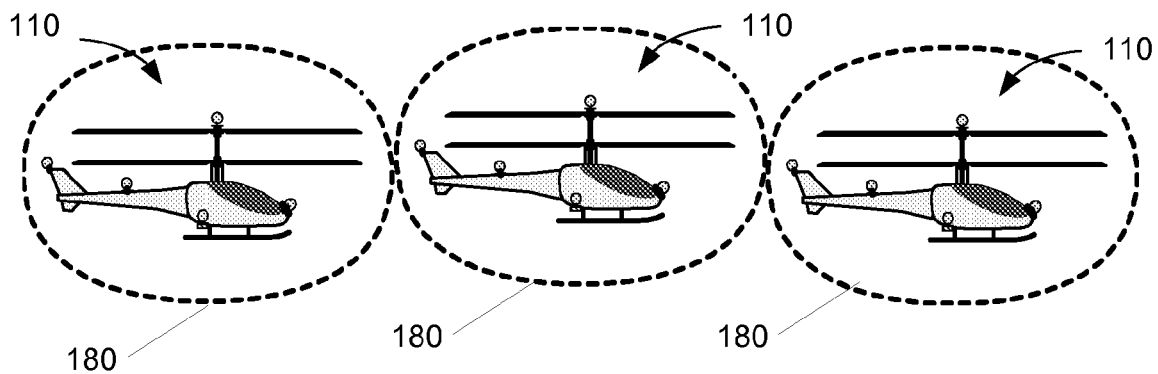
FIG. 5 shows a plurality of teleoperable devices, each having a virtual contact proximity field, in accordance with another embodiment of the invention.

In other embodiments, a dynamically adjustable proximity field that extends around one or more stationary and moving objects can be modeled to provide additional clearance volume around such objects. For example, FIG. 5 shows a plurality of teleoperable devices 110, each having a proximity field 180, in accordance with an embodiment of the invention. The proximity fields 180 may advantageously be used as constraints by the teleoperated system to prevent collisions with obstacles and other vehicles.

Figure 6:
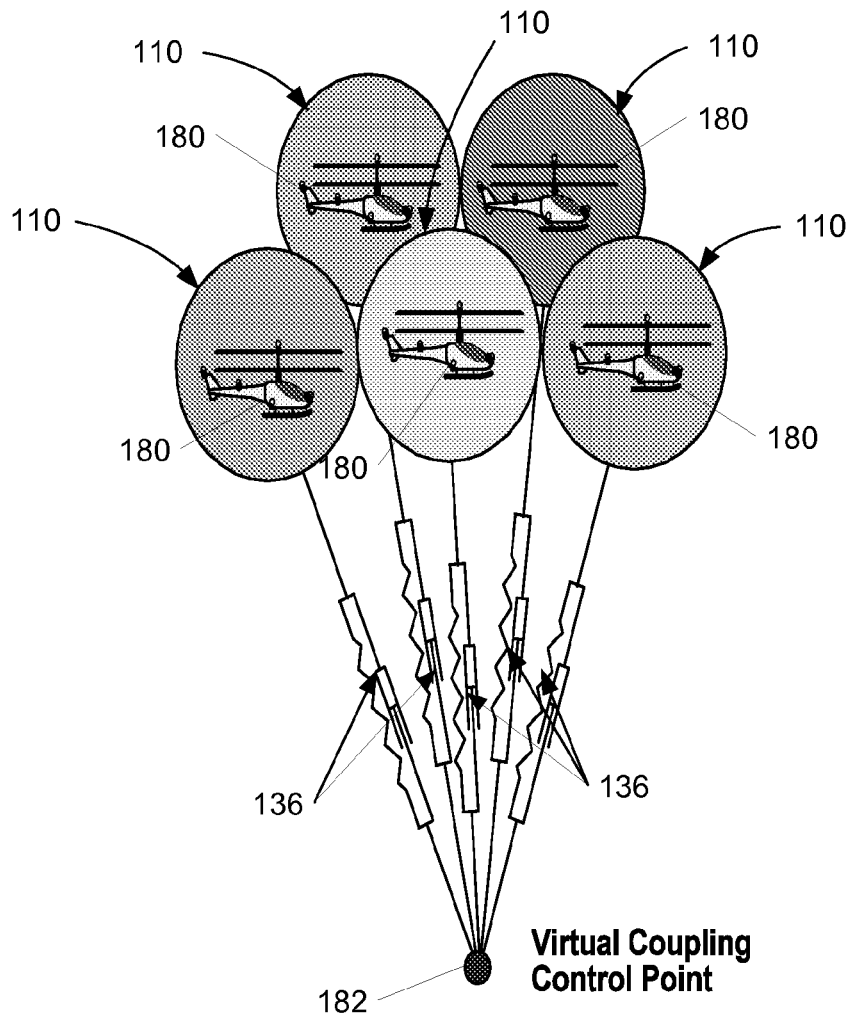
FIGS. 6 and 7 show a plurality of teleoperable devices controlled by a single agent in accordance with further embodiments of the invention.
Figure 7:
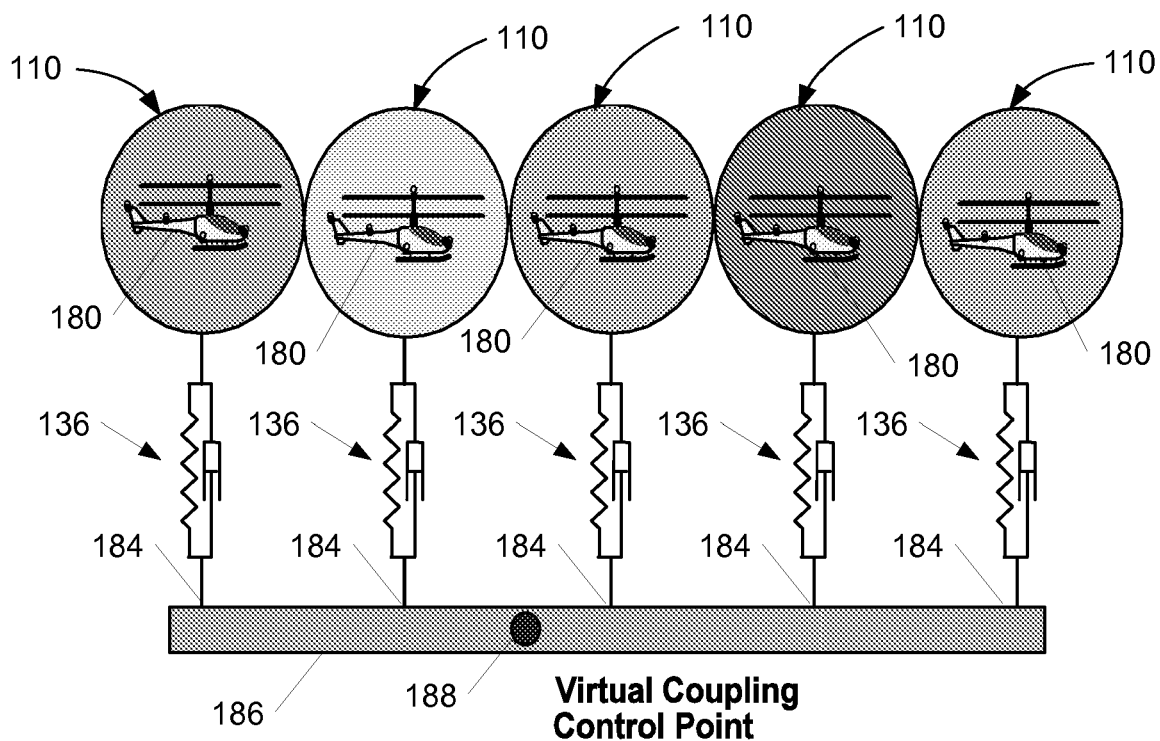

Similarly, the haptics and virtual coupling techniques disclosed herein can also be applied to control multiple vehicles from the same input device. For example, FIG. 6 shows a plurality of teleoperable devices 110 in accordance with one embodiment of the invention. A proximity field 180 surrounds each teleoperable device 110, and each teleoperable device 110 is virtually connected to a virtual coupling point 182. Similarly, FIG. 7 shows a plurality of teleoperable devices 110, each having an associated proximity field 180, and each virtually coupled to an attachment point 184 on a virtual constraint element 186. The virtual constraint element 186 can be rigid, flexible, and/or branched, and is typically controlled through a virtual coupling point 188 which is attached to the haptic device. The teleoperable devices 110 of FIGS. 6 and 7 may be able to move relative to each other, but will not collide with each other due to the proximity fields 180 extending around each device 110.

Thus, the teleoperable devices 110 of FIGS. 6 and 7 may be controllably moved by a teleoperated system as a unit. In the embodiment shown in FIG. 6, the system may controllably move the plurality of teleoperable devices 110 by controlling the movement of the virtual coupling point 182, while in the embodiment shown in FIG. 7, the system may controllably move a virtual coupling control point 188 located, for example, anywhere on the virtual member 186. In various aspects, the teleoperable devices 110 may be commanded to move independently of one another, or alternately, two or more of the teleoperable devices 110 may be commanded to move in a coordinated manner, such as in flocking or swarming movements. Particular embodiments of coordinated movements of a plurality of vehicles are described more fully, for example, in Beyond Swarm Intelligence: The Ultraswarm, presented at the IEEE Swarm Intelligence Symposium by Holland et al., Jun. 8, 2005, incorporated herein by reference.

One particular aspect of this type of swarm control is the virtual branching structure that can be used at the virtual coupling control point 182 (FIG. 6) and 188 (FIG. 7). In a first or default mode, all teleoperable devices 110 may use the same virtual coupling point 182 with proximity fields 180 providing separation, as described above. This results in a formation that is analogous to a person holding the strings of several helium balloons in one hand (FIG. 6). The proximity fields 180 touch and move relative to each other (like the surfaces of the balloons) but the teleoperable devices 110 inside stay safely away from each other. In a branched virtual coupling (FIG. 7), desired offset positions are specified. Using the balloon analogy again, this would be similar to attaching the strings to a board (e.g. virtual member 186 of FIG. 8) such that moving the board moves all the balloons, while maintaining specified relative spacing.

The branching concept allows vehicles or other teleoperable devices to be configured in any type of formation, but still provides for relative movement and a group connection to the virtual coupling control point 188 for haptic feedback. For example, a linear array could be specified to allow the formation to move through a narrow opening, or a widely dispersed configuration could be specified to allow maximum area coverage. The branching element itself can be a variable function with adjustable position constraints controlled by other algorithms. For example, the virtual coupling point 182 could be placed at the "head" of an articulated array and used to lead the formation through a convoluted narrow pathway. All contact and inertia forces generated by each vehicle in these multi-vehicle configurations are transmitted through the virtual coupling control point 182 or 188 to the haptic device. This allows the user to receive simultaneous force feedback from all controlled vehicles.

Furthermore, the improved teleoperation capabilities of the haptic-enabled feedback environment described herein can be enhanced to work with the concept of adjustable autonomy, which is the ability to move seamlessly between fully human controlled teleoperation and fully autonomous vehicle operation. In this type of unified application, the real-time simulation environment is the common element bridging human teleoperation with control provided by autonomous agents. Geometric constraints and autonomous actions will both work through the virtual coupling connection to the remote vehicle or device.

In one particular embodiment, the virtual environment and simulated dynamics may be modeled using the commercially available Voxmap PointShell (VPS) software development toolkit (SDK) developed by The Boeing Company. The VPS libraries enable fast collision/proximity detection and reaction force generation desirable for haptics simulations. The VPS physics-based simulation engine uses second order dynamics models to calculate realistic object motion, and runs at a real-time update rate of 1000 Hz. This generation process is called haptic force rendering.

Control and force feedback to and from the teleoperable device 110 and the haptics device 120 is provided by virtual coupling, including the use of multi-degree-of-freedom spring-damper elements, as described above with reference to FIGS. 1 and 2. In some embodiments, the positions defined by the motion capture system 420, and closed-loop feedback control algorithms described in the above-incorporated Haptics-e publication by McNeely et al., can be treated in a similar manner to a virtual coupling point attached to the haptics handle 122. Similarly, in further embodiments, the teleoperable device 110 virtual coupling concept may be an extension of the multi-user interaction techniques described in the Haptics-e publication by McNeely et al. (FIG. 1). Again, motion forces applied to any I/O component of the system 400 may be transmitted to other I/O components in a bilateral force feedback scheme, and each I/O component may see other I/O components as peers with similar I/O capabilities.

It will be appreciated that the simulation environment described above may be suitably used for generating haptic forces for the simulated (or proxy) device 112 (see FIG. 1) which are transmitted to both the haptics handle 122 and the teleoperable device 110 through virtual couplings 130, 136. Thus, any contact, inertia, or constraints in the virtual environment may affect the simulated device 112 and are transmitted to the user 124 and the teleoperable device 110. In a similar way, the motion of the haptics handle 122 by the user 124 moves the simulated device 112 which also moves the teleoperable device 110, and vice versa. The state conditions of the components connected by virtual couplings 130, 136, and the position data provided by the motion capture system 420, are provided to a device controller update loop of the program 413.

In some embodiments, such as the one shown in FIG. 3, the system 400 uses TCP or UDP network sockets to communicate between the tracker processing PC 402 and the application PC 450. The control software running on PC 450 computes and sends actuator commands to the teleoperable device 110 through the communication component 456. The haptic device 120, haptics software 416, and virtual environment software 415 are also running on PC 450. A variation of the system configuration shown in FIG. 3 allows the haptic device 120 to be connected to a different computer, such as computer 451 (FIG. 4), using the same type of socket connections. Since haptics computations can be quite demanding, using this second method may advantageously provide additional processing capability for situations where a single PC doesn't have enough processing resources to handle the full work load.

The handle 122 of the haptics device 120 may in some embodiments be analogous to a 3D version of a flight control "stick" in real airplanes. The kinesthetic and tactile feedback of the haptics device 1200 may also be similar to the feedback of an airplane control stick, except the haptics handle 122 may have the additional ability to transmit vertical motion. In further embodiments wherein the teleoperable device 110 is a helicopter, a separate helicopter collective pitch controller may not be needed, as moving the handle 122 vertically may serve to move the helicopter vertically. Also, in still other embodiments, the haptics device 120 may directly control position, where as a flight control stick on an airplane typically controls rate. Alternately, the haptics device 120 may be configured to control rates if desired. Typically, oscillations and vibrations can be felt through the haptic handle 122, and other tactile events, like a "stick shaker" algorithm, can be programmed to provide additional information.

Haptic input control may be especially advantageous for control of holonomic or near-holonomic vehicles, such as a helicopter. As used in this disclosure, a vehicle is considered to be holonomic if the controllable degrees of freedom are equal to the total degrees of freedom. Helicopters are considered holonomic in terms of the translational motions. Using embodiments of the invention, the helicopter translational motions map to the translational motion of the handle (or end effector) 122 of the haptics device 120 having three degrees-of-freedom (DOF) in Cartesian space. Devices 120 such as the articulated arm shown in FIG. 2 may be well-suited for this purpose.

In the context of teleoperated aerial vehicles, different embodiments of the invention may use different control methods. For example, main types of control methods include direct control and fly-by-wire control. In direct control methods, specific motions of flight control actuators are commanded directly by the operator. This often requires substantial piloting skill and experience since stable and efficient operation may depend on detailed and intuitive knowledge of the flight characteristics of the vehicle. Fly-by-wire control methods reduce the need for specific stabilizing commands by the pilot by providing a computer that specifies the actual positions of the flight control actuators based on desired vehicle motion specified by the pilot. The computer may also provide flight envelope protection. An operational understanding of the vehicle by the pilot is still desirable, but less skill at manipulation of the flight control actuators is typically needed.

Embodiments of the invention may be implemented in teleoperated systems that use either direct control or fly-by-wire control systems, wherein forces from the vehicle dynamics are presented to the operator through a haptic force feedback device. Relatively low-level feedback of the aircraft's motions is available to the operator, providing a more intuitive understanding, or "feel", of the vehicle dynamics. The high level commands, which set the goal positions for motion, can be provided by human operators (i.e., teleoperation) or by path planning software (like the potential field approach). Boundary constraints and flight envelope protection can be added to provide additional fly-by-wire capabilities to the teleoperation control mode. Furthermore, embodiments of teleoperated systems having motion capture systems provide the ability to perform remotely piloted, closed-loop haptic feedback.

With reference to FIGS. 3 and 4, in operation, the application computer 450 operatively communicates with the teleoperable device 110 via the communication component 456, which may use a wireless link, wire-based link, fiber-optic link, or any other suitable type of communication link. The communication component 456 communicates signals and data between the application computer 450 and the teleoperable device 110. In an alternate embodiment, the application computer 450 may be configured to receive video, sensor signals, and other telemetry directly from the teleoperable device 110, and to transmit appropriate command signals directly to the teleoperable device 110. The control program 413 implemented on the application computer 450 may perform a variety of functions associated with monitoring and controlling the teleoperable device 110. Alternately, the application computer 450 may include one or more programmable hardware components configured to perform one or more of these functions. In still other embodiments, the control program 413 and the application computer 450 could be combined by programming the control application algorithm into firmware.

In operation, the application computer 450 causes appropriate command signals to be transmitted to one or more teleoperable devices 110, directing the one or more teleoperable devices 110 to perform desired activities or functions. For example, if the teleoperable device 110 is a flight vehicle, the command signals may direct the flight vehicle to fly in a desired flight path and to collect desired information using on-board sensors. Similarly, a ground or water-based vehicle may be directed to traverse a desired path, collect information, or perform other desired activities. For those embodiments having a plurality of teleoperable devices 110, the teleoperable devices 110 may be commanded to move independently of one another, or alternately, two or more of the teleoperable devices 110 may be commanded to move in a coordinated manner, such as in flocking or swarming movements.

Using the real-time data export capability of the motion capture processing system 410, position and orientation information is sent to the command and control program 413 or other suitable control application or component. The position and orientation data provided by the motion capture processing system 410 are differentiated to get velocity and angular velocity (both of which may also be filtered to reduce noise) for each degree-of-freedom. Position, orientation, linear and angular velocity data is then converted into vehicle coordinates (by using 4×4 homogeneous transformation matrix multiplication) and used to calculate error signals, which are then multiplied by feedback gain values, and then used to generate the actuator control values for the actuators of the teleoperable device 110.

Next, the actuator control values determined by the control application (e.g. the control software 413 on the application computer 450) may be converted into a format needed by the communication device 456 prior to transmission to the teleoperable device 110 by the converter 458. In one particular embodiment, the converter 458 is an analog 72 MHz RC (remote control) transmitter having a "trainer" port which connects to the application computer 450 using a USB or serial connection. In another specific embodiment, a USB-based, pulse-position-modulation (PPM) servo controller converter may be used for PC (personal computer) to RC data conversion, such as those converters commercially available from TTI, Inc. of Fremont, Calif. In alternate embodiments, any suitable analog or digital transmitter devices and converters may be used.

During movement of the teleoperable device 110 within the control space 422, as shown in FIGS. 3 and 4, the motion capture system 420 tracks the positions of the retro-reflective markers 426 on the teleoperable device 110 and generates a representation of the position and orientation (quaternion or 4×4 homogeneous transformation matrix) of a particular grouping of retro-reflective markers 426. The various controllable devices and other objects in the environment are identified by the motion capture system 420 based on the unique pattern of retro-reflective marker placements on each object. In some embodiments, the control software 413 running on the application computer 450 compares the position and orientation feedback information with the desired positions of the teleoperable device 110, determines the desired actuator inputs for controlling the movement of the teleoperable device 110 and causes appropriate command signals to be transmitted to the teleoperable device 110 via the communication component 456 to controllably adjust (or maintain) the positions and velocities of the teleoperable device 110 in its desired positions or along its desired headings at the desired rates of movement. Alternately, the control signals may be generated by the user 124 via the haptics device 120, or a combination of user-generated and control software 413 generated control signals may be used.

Thus, the motion capture system 420 provides the teleoperated system 400 with the position and orientation information needed for a closed-loop feedback control capability for adjusting the positions and movements of the teleoperable device 110. More specifically, the motion capture system 420 may advantageously provide position and orientation feedback information that enables the application computer 450 to determine and control not only Cartesian positions (x, y, z), but also orientation (roll, pitch, yaw) control commands for proper control and stabilization of the teleoperable device 110.

The system 400 described above and shown in FIGS. 3 and 4 is depicted as being used in an indoor environment; however, operation in other environments is also possible. For example, the system 400 may be suited to operate in some outdoor environments. In alternate embodiments, other types of position tracking systems can be used in place of the camera-based motion capture system 420 to further facilitate outdoor implementations. For example, with the addition of acceleration data from on-board accelerometers or inertial measurement units (IMUs) and GPS, larger outdoor systems can be implemented.

Embodiments of systems and methods in accordance with the present invention may provide significant advantages over the prior art. The haptic feedback for teleoperation of devices provides tactile and kinesthetic cues that indicate the device's reaction to user inputs. The implementation of improved teleoperation processes in accordance with the present disclosure will result in higher performance for teleoperable devices, including remotely piloted vehicles, due to increased information flow through tactile and kinesthetic channels of the human operator. This performance increase will enable off-board operators to re-claim some of the precise control abilities available to an onboard operator of such a device, (e.g. a pilot onboard an aircraft) which may include: increased safety, faster reaction times to unexpected disturbances, and the precise flying ability for helicopter pilots needed to hook and lift objects. In short, haptic feedback helps return the "seat-of-the-pants" flying abilities to the remote pilot. Embodiments of systems and methods in accordance with the present invention may also provide a well structured development environment for testing various types of control techniques using force feedback in a laboratory setting. Finally, embodiments of systems and method having motion capture systems advantageously provide the above-noted abilities and performance enhancements via close-loop, haptic feedback control systems.

Figure 8:
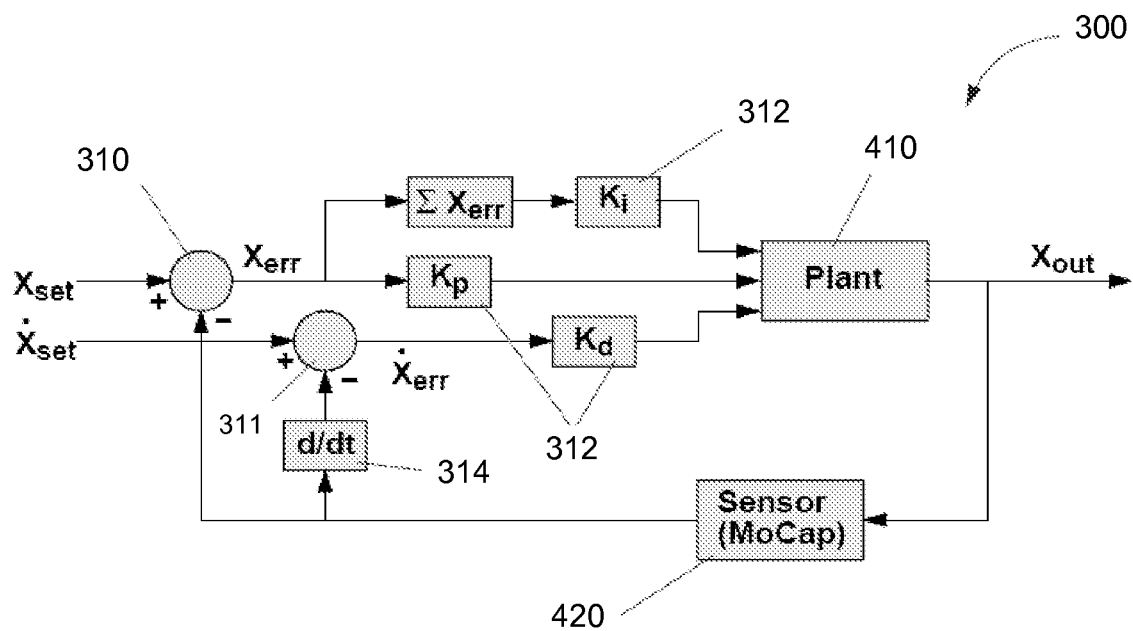
FIG. 8 is a schematic representation a feedback control system used in one embodiment of the invention.

Additional details of various aspects of systems and methods in accordance with the invention will now be described. FIG. 8 is a diagram of a control method 300 for controlling one or more vehicles 410 using the control system 400 of FIGS. 1 through 3. In this embodiment, the method 300 includes providing a high-level command request, which may come from a human operator, an autonomous agent, or another higher-level source. In embodiments using teleoperation, the command requests may come from a user interface, such as a haptic device, 120. The desired high-level command request is converted to a properly formatted vehicle command (e.g. state vector Xset of FIG. 8). A closed-loop feedback control loop begins when the vehicle-formatted command request, which is determined by a function of the desired and measured states, is sent to the vehicle ("Plant" in FIG. 8). Next, one or more positions and orientations of the one or more vehicles 410 are acquired. Initially, the one or more positions and orientations may be known, such as from inputs or initial conditions during start up of the method 300, or may be determined by the position reference system 420. The control loop is closed by feeding the measure position and orientation information back to the start of the process. The control loop is the implementation of one or more of the control methods described above, and is responsible for maintaining the desired trajectory and recovering from unexpected disturbances.

In one embodiment, a method called a proportional, integral, derivative (PID) control is used. This method applies a set of feedback control gains ($K_p$, $K_i$, $K_d$, blocks 312 in FIG. 8) to the state vector errors (Xerr of FIG. 8) to determine the control signals sent to the controlled device (or Plant) 410. At summing junction block 310, the method 300 determines the difference (Xerr) between the desired positions and the values measured by the motion capture system 420. Similarly, at junction block 311, the method 300 determines the difference between the desired velocities and the velocities determined by differentiating (block 314) the position values measured by the motion capture system 420. Appropriate actuator control signals are determined by multiplying the error values leaving the summing junctions 310 and 311 by the feedback gains ($K_p$, $K_i$, $K_d$) at blocks 312. Additional embodiments may use other control techniques that use the current system state or predicted state for feedback control (e.g., Pole-placement, LQR). In addition, data multiple types of position, velocity, or acceleration measurement systems could be combined with the motion capture data to give a more accurate estimate of the state (e.g., Kalman filter). Next, the determined actuator control signals may be converted to RC (remote control) signals, and the RC signals may be transmitted to the vehicle 410. Multiple instances of method 300 can be run simultaneously to control one or more additional controlled devices from one or more application computers 450 (FIG. 3). For teleoperation embodiments of this method, the measured position and derived velocity data may also be sent to a virtual simulation environment (416) for use in haptic force generation.

The vehicle 410 may move in response to the control signals, and the positions and velocities of the vehicle 410 are monitored and measured by the position reference system 420. The method 300 then returns to where the measured positions and velocities are updated and the above-described actions are repeated indefinitely. In this way, the method 300 uses the motion capture system 420 to provide position and orientation data for closed-loop feedback control of the controlled device 410.

It will be appreciated that various modules and techniques may be described herein in the general context of computer-executable instructions, such as program modules, executed by one or more computers or other devices. Generally, program modules include routines, programs, objects, components, data structures, and so forth for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 9:
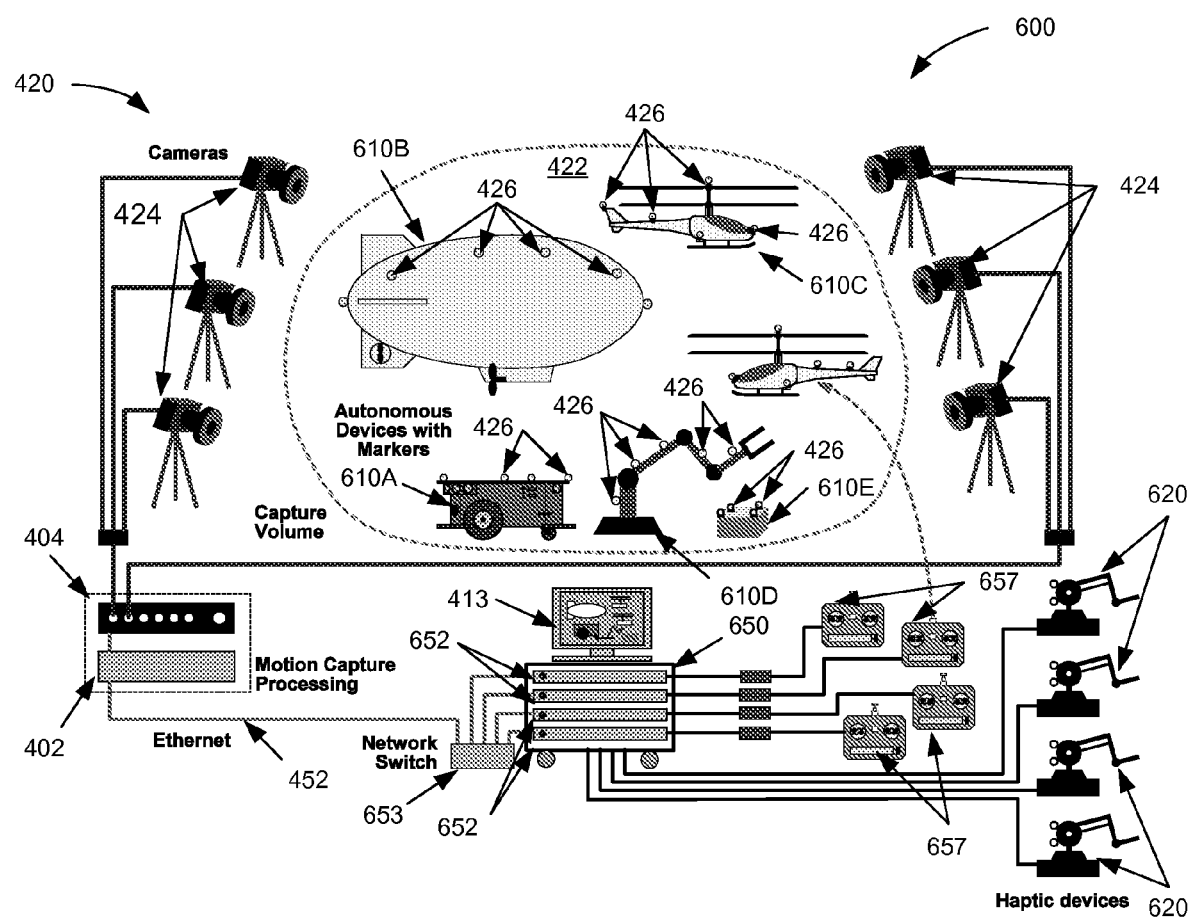
FIG. 9 is a schematic view of a haptics-enabled teleoperated system with multiple teleoperated vehicles control through multiple haptic interfaces in accordance with another embodiment of the invention.

FIG. 9 is a schematic view of a haptics-enabled teleoperated system 600 in accordance with another embodiment of the invention. It will be appreciated that several of the components of the system 600 are substantially the same as the corresponding components described above with respect to FIGS. 1 through 4, and therefore, for the sake of brevity, such components will not be described in detail again. In this embodiment, the teleoperated system 600 is configured to simultaneously monitor and control a plurality of controllable devices 610 using a corresponding plurality of haptics controllers 620. More specifically, the motion capture system 420 monitors a control volume 422 that includes a ground vehicle 610A, a blimp (or lighter-than-air vehicle) 610B, and a plurality of helicopters 610C, robot arms 610D, and other controllable objects 610E. Of course, in alternate embodiments, any other suitable controllable devices may be used. Also in alternate embodiments, other types of position and orientation tracking may be used.

In an alternate embodiment, at least one of the controllable devices 610 is a flying crane platform. Embodiments of haptics interaction methods allow precise control of such a lifting platform without the extensive training needed to operate an actual helicopter. One of the difficulties with such lifting platforms is hooking a payload. A teleoperated interface in accordance with the present invention would make this task much more efficient. Smaller flying cranes are another primary application of this technology, including devices for performing tasks like lifting debris from a road or moving parts in a factory.

In embodiments using a motion capture system for position and orientation tracking, each of the controllable devices 610 is configured with a plurality of retro-reflective markers 426 that are monitored and tracked by the motion capture system 420 as described above. The retro-reflective markers 426 (or other suitable marking devices) may be placed in different patterns on the controllable devices 610 to enable the motion capture system 420 to identify and distinguish between the individual controllable devices 610.

As further shown in FIG. 9, in this embodiment, an application computer 650 includes a plurality of application processors 652 that are coupled to the motion capture processing computer 402 via a network switch 653. Each application processor 652 receives the outputs from the motion capture processing computer 402 (e.g. the position and orientation data provided by the motion capture system 420), performs any necessary filtering, buffering, signal amplification, or other desired functions, and transmits the control signal data to a corresponding converter 655. The converter 655 performs the conversion of the control signals to a format suitable for transmission to the controllable devices 610 as described above, and communicates the properly formatted control signals to the corresponding transmitter 657 for transmission to the corresponding controllable devices 610 by way of the transmitter's "trainer" port. In alternate embodiments, transmitter 657 can be replaced by other types of wireless communications equipment (e.g., 802.11, Bluetooth).

In a further embodiment, the motion capture information provided by the motion capture system 420 may be broadcast to one or more control components of the system 600, such as the software 413 implemented on the application computer 450, for determination of the range and speed of each controllable device 610, including any actions that may be needed to avoid collisions.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system for teleoperation of a vehicle, comprising:
a control component configured to provide position and orientation control to the vehicle and to receive a haptic force feedback in response to a signal from the vehicle, the haptic force feedback based in part on inertia forces of the vehicle, the haptic force feedback configured to function in a closed-loop feedback manner.

2. The system of claim 1, wherein the control component receives six degree-of-freedom haptic force feedback provided by a motion capture system via a haptic input/output (I/O) component, the six degree-of-freedom haptic force feedback including a rotational force.

3. The system of claim 1, wherein differences in at least one of position and velocity between the vehicle and a haptic I/O device are used for the closed-loop feedback.

4. The system of claim 1, wherein differences in at least one of position and velocity between the vehicle and a simulated proxy object provide one or more control requests to the vehicle, and wherein differences in at least one of position and velocity of the simulated proxy object and a haptic I/O device are used for the closed-loop feedback.

5. The system of claim 1, wherein the control component is further configured to simultaneously control a plurality of vehicles.

6. The system of claim 1, wherein the vehicle is capable of at least one of capturing, manipulating, lifting, depositing, and spraying external objects.

7. The system of claim 1, wherein additional force feedback is generated by one or more constraints of an envelope protection system built into the control component, and wherein the one or more constraints include at least one of collision avoidance, attitude limitations, rate limitations, and preventing departure in uncontrolled flight.

8. The system of claim 1, wherein the control component is further configured to enable a plurality of operators to use a plurality of haptic I/O devices to control of a plurality of unmanned aerial vehicles.

9. The system of claim 1, wherein the control component is further configured to provide the position and orientation control using mapping between a position/orientation input device and the vehicle, and wherein the mapping is scaled at least one of linearly and non-linearly.

10. The system of claim 1, wherein the control component is further configured to provide the position and orientation control using at least one rate controlled control input.

11. The system of claim 1, wherein the vehicle is at least one of a holonomic vehicle, a near-holonomic vehicle, an aerial vehicle, an underwater vehicle, and a zero-gravity environment vehicle.

12. A method of operating a teleoperable device by directly controlling least one of position and orientation of the teleoperable device, comprising:
receiving an input to a haptics device linked to the teleoperable device;
providing at least one control signal to the teleoperable device based on the input, the at least one control signal being configured to directly control at least one of position and orientation of the teleoperable device;
measuring an inertial force of the teleoperable device;

receiving a haptics signal from the teleoperable device based on the intertail force; and providing a haptics output to an operator based on the haptics signal.

13. The method of claim 12, wherein the receiving the input to the haptics device includes receiving a six degree-of-freedom physical input to the haptics device.

14. The method of claim 12, wherein the measuring the inertial force of the teleoperable device includes measuring at least one motion characteristic of the teleoperable device using a motion capture system.

15. The method of claim 14, wherein the haptics output is further based on at least one of a headwind experienced by the teleoperable device, a turbulence experienced by the teleoperable device, a battery level of the teleoperable device, and an increased mass of the teleoperable device due to a lifting of an object by the teleoperable device.

16. The method of claim 14, further comprising:
determining at least one additional control signal based on the at least one motion characteristic; and
providing the at least one additional control signal to the teleoperable device to control the at least one motion characteristic of the teleoperable device in a closed-loop feedback manner.

17. The method of claim 12, further comprising simulating at least one characteristic of an operating environment of the teleoperable device, and wherein providing the haptics output to an operator includes providing the haptics output to the operator based at least partially on the at least one simulated characteristic of the operating environment.

18. The method of claim 17, wherein the simulating the at least one characteristic of the operating environment includes simulating at least one of a solid obstacle, a moveable object, an airflow condition, a movement boundary condition, and a proximity field disposed about the teleoperable device.

19. The method of claim 12, wherein the providing the haptics output to the operator includes providing a rotational force to a handle felt by the operator.

20. A system for operating a teleoperable device by controlling least one of a position and orientation of the teleoperable device, comprising:
a haptics device coupled to the teleoperable device using at least one virtual coupling and configured to receive an operator input, the haptic device configured to provide a haptics output to an operator based on the inertial force of the teleoperable device, wherein the haptics device is further configured to provide at least one control signal to the teleoperable device to directly control at least one of position and orientation of the teleoperable device based on the operator input; and
a sensing system operatively coupled to the haptics device and configured to measure an inertial force of the teleoperable device.

21. The system of claim 20, wherein the haptics device is coupled to the teleoperable device by a bilateral force feedback arrangement to the teleoperable device.

22. The system of claim 20, wherein the sensing system includes a motion capture system configured to measure the inertial force of the teleoperable device.

23. The system of claim 20, wherein the haptics device is further configured to measure an acceleration of the teleoperable device.

24. The system of claim 20, wherein the haptics device is further configured to provide at least one control signal to the teleoperable device based on the inertial device measured by the sensing system in a closed loop feedback manner.

25. The system of claim 20, wherein the teleoperable device comprises at least one of an aerial vehicle, a manufacturing robot, a water-based vehicle, a land-based vehicle, and a zero-gravity vehicle.

* * * * *